May 21, 1968 G. K. GRECHUS 3,384,279

METHODS OF SEVERING BRITTLE MATERIAL ALONG PRESCRIBED LINES

Filed Aug. 23, 1966

INVENTOR
G. K. GRECHUS
BY R. P. Miller
ATTORNEY

United States Patent Office 3,384,279

Patented May 21, 1968

3,384,279

METHODS OF SEVERING BRITTLE MATERIAL ALONG PRESCRIBED LINES

Garland K. Grechus, Kansas City, Mo., assignor to Western Electric Company, Incorporated, New York, N.Y., a corporation of New York Filed Aug. 23, 1966, Ser. No. 574,381
6 Claims. (Cl. 225—2)

This invention relates to methods of severing brittle material along prescribed lines and, more particularly, to methods utilizing ultrasonic vibrations in a liquid subjected to a reduced pressure to induce cavitation in the liquid to sever a submerged brittle substrate or semiconductor slice along grooves formed on its surface.

In the manufacture of semiconductor devices, it is known that a semiconductor slice can be divided into sections of predetermined size by scribing a plurality of grooves on the surface of the slice and then stressing the slice to fracture it along the grooves. In the prior art, one method of fracturing has been accomplished by passing the semiconductor slice between resilient rollers to establish a nonuniform stress distribution in the slice. This fracturing method results in nonuniform separation of the slice into wafers or diced bits having irregular edges. The nonuniform separation results in considerable wasting of semiconductor material because many of the wafers are not suitable for use in the manufacture of semiconductor devices. When the semiconductor slice has been processed to define a plurality of components thereon, improper separation of the slice results in costly losses of components. In a second method of fracturing, ultrasonic vibrations are applied to a liquid submerging the semiconductor slice to effect separation of the slice along lines scribed on its surface. This method requires that extremely high levels of ultrasonic energy be applied to the liquid for extremely long periods of time before fracturing will occur. It has been observed, for example that separation of a semiconductor slice submerged in a tank containing approximately ½ gal. of water did not occur when the water was subjected to continuous vibration at an inpute power of 345 watts at a frequency of 40 kc. for 30 minutes.

An object of this invention resides in a new and improved method of severing brittle material along prescribed lines.

Another object of the invention resides in utilizing ultrasonic energy to obtain uniform separation of a substrate or slice of brittle material along grooves formed on its surface.

A further object of the invention is the utilization of the phenomenon of cavitation induced in a liquid by application of ultrasonic energy to separate a substrate of brittle material along grooves scribed on its surface.

Another object of the invention is the provision of a method of separating a semiconductor slice into wafers utilizing ultrasonic vibrations to induce cavitation in a liquid rendered more susceptible to cavitation by reduction of the applied pressure to sever a submerged slice along grooves formed on its surface.

With these and other objects in view, the present invention contemplates a new and improved method of ultrasonically severing brittle materials, submerged in a liquid, along defined lines. More particularly, grooves are formed on the surface of a substrate of brittle material, and then the substrate is submerged in a liquid and the pressure on the liquid is reduced. Thereafter, the liquid is subjected to ultrasonic vibrations to induce cavitation in the liquid which stresses the substrate until it fractures along the grooves.

Other objects and advantages of the present invention will become apparent upon consideration of the following detailed description in conjunction with the accompanying drawings, wherein.

Figure 1:
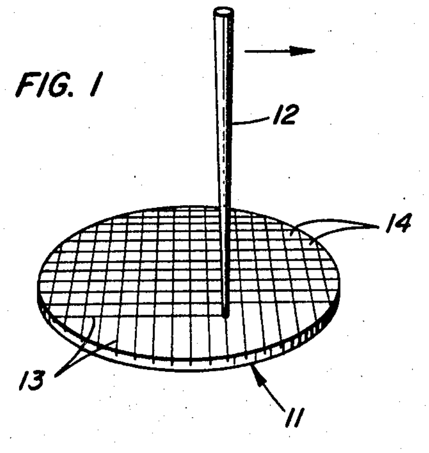
FIG. 1 is an illustration of a substrate of brittle material and a scribing tool which is used to form grooves on the surface of the substrate.

Referring first to FIG. 1, there is shown a perspective view of a substrate 11 and a scribing tool 12 which is used to form grooves 13 on the surface of the substrate 11. For the purposes of the following discussion, the word "substrate" is defined to include not only brittle substrate materials, such as glass or ceramic, but also slices of brittle semiconductor material, such as silicon or germanium. The scribing tool 12 may be a metallic or a diamond bit. The grooves 13 divide the substrate 11 into a plurality of substrate sections 14. As shown in FIG. 1, the grooves 13 may be in the form of straight lines running completely or substantially across the surface of substrate 11, but this invention is not limited to any particular arrangement of grooves. Any pattern of grooves which divides the substrate 11 into a plurality of sections, for example, a single groove running completely across the substrate 11, may be used in practicing the method of this invention. In the manufacture of semiconductor devices, when it is necessary to separate components from a semiconductor slice after group processing or to form wafers of suitable shape for component fabrication from a single semiconductor slice, the grooves 13 can be arranged in a generally rectangular pattern to facilitate separation of the slice into discrete components or wafers.

Figure 2:
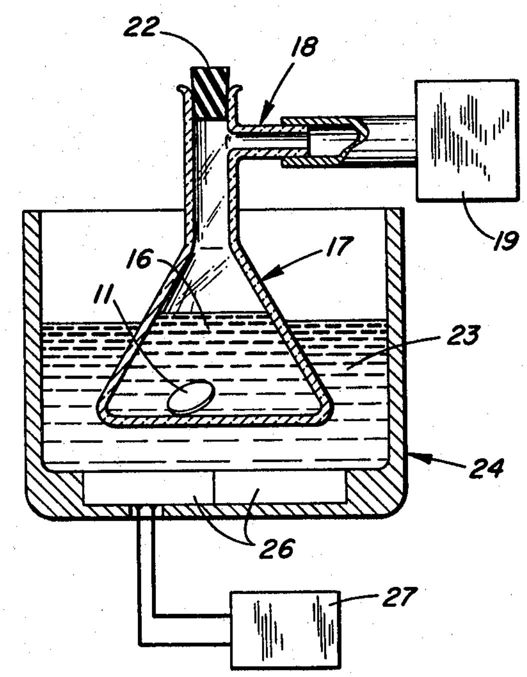
FIG. 2 is an elevational view, partially in section, of an ultrasonic apparatus used in combination with a liquid filled, sealed container for severing the substrate by methods embodying the principles of the present invention.

In order to separate the substrate 11 along the grooves 13 on its surface, an ultrasonic apparatus, illustrated in FIG. 2, may be utilized. The substrate 11 is shown submerged in a liquid 16, for example, water, which partially fills a container 17, for example, a flask. A connecting tube 18, formed as an integral part of the container 17, facilitates connection between a vacuum source 19, for example, a conventional aspirator pump, and the container 17. A plug 22 is used to seal the container 17 from the surrounding atmosphere. Thus, it can be seen that the container 17 provides a chamber in which the substrate 11 is submerged in the liquid 16.

The container 17 is partially submerged in a second liquid 23, for example, water, contained in a tank 24. Mounted in the base portion of the tank 24 are a pair of transducers 26, such as piezoelectric crystals, which convert electrical signals to mechanical vibrations. The transducers 26 are connected to an electrical generator 27 capable of producing signals at ultrasonic frequencies.

At this point, it should be noted that it is not necessary to use two liquids in the practice of the present invention. The substrate 11 could be directly submerged in liquid 23 if the vacuum source 19 were utilized to reduce the pressure acting on the surface of the liquid 23. The container 17 is used for convenience in subjecting the liquid 16, submerging the substrate 11, to a reduced pressure and in locating the substrate 11 at points of maximum vibration within the liquid 23.

In practicing the method of the present invention, the grooves 13 are first formed on the surface of substrate 11 by the scribing tool 12. Then the substrate 11 is submerged in the liquid 16, which is contained in the chamber formed by the container 17, and the plug 22 is inserted into the container 17 to seal its contents from the surrounding atmosphere. Container 17 is then submerged in a second liquid 23. At this time, the pressure acting on the surface of the liquid 16 has the same value as that of the surrounding atmosphere.

Next, power is applied to the generator 27 which applies electrical signals of ultrasonic frequency to the transducers 26. The transducers 26 convert the applied electrical signals to mechanical vibrations which are transmitted to the liquid 23 and induce nodes and antinodes within the liquid 23. The ultrasonic vibrations pass from the liquid 23 through the walls of container 17 to the liquid 16 and the substrate 11. The substrate 11 can be located at an antinode, a point of maximum vibrational amplitude, by manually positioning the container 17 in the liquid 23 until the most violent vibration of the substrate 11 is observed.

Cavitation will occur in the liquid 16 if the power level of the vibrations equals or exceeds the threshold value of power required to initiate cavitation. The threshold value is determined by the frequency of the applied vibrations and the pressure acting upon the surface of the liquid 16. It has been observed that although cavitation can be induced in the liquid 16 at atmospheric pressure, that the rate of cavitation is not sufficiently high to produce the desired severing of the substrate 11. The phenomenon of cavitation may be briefly described as a rupturing of a liquid which occurs when the liquid is subjected to vibrations. The rupturing results in discontinuities or cavities in the liquid which are immediately filled by the surrounding liquid. If the cavitation occurs at or near the surface of the substrate 11, then the substrate 11 is subjected to forces which will fracture it along the grooves 13 if the rate of cavitation is sufficiently high.

Finally, the pressure acting upon the surface of liquid 16 is reduced by operation of the vacuum source 19 until the rate of cavitation is sufficiently high to sever the substrate 11. It may be convenient to reduce the pressure to the vapor pressure of the liquid 16 since at this pressure cavitation occurs with such violence that the substrate 11 is severed in approximately 15 seconds. This pressure can be obtained by using a conventional aspirator pump and can be determined by observing the surface of the liquid 16. When the pressure is reduced to the vapor pressure of the liquid 16, vaporization occurs so rapidly that it results in a readily observable agitation of the surface of the liquid 16. Reducing the applied pressure renders the liquid 16 more susceptible to cavitation by decreasing the threshold energy required to initiate cavitation, so that at any power level of ultrasonic vibrations which equals or exeeds the threshold value the rate of cavitation is substantially increased. The increased rate of cavitation results in greater forces being applied to the substrate 11 to sever it along the grooves 13. It should be noted that the order in which the steps described above are performed is immaterial, so that the pressure acting on the liquid 16 could be reduced before the ultrasonic energy is appiled to the transducers 26.

Figure 3:
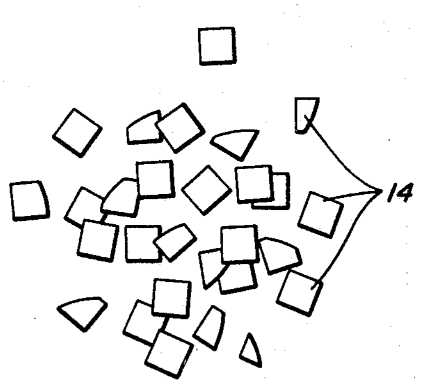
FIG. 3 is an illustration on an enlarged scale of the sections of brittle material formed by the severing method of the present invention.

FIG. 3 illustrates the substrate sections 14 after the steps of the servering method of the present invention have been performed. It should be noted that the substrate 11 has been severed along the scribed grooves 13 formed on its surface into a plurality of substrate sections or wafers 14 having sharply defined edges.

One important application of the present invetnion is in the manufacture of semiconductor devices such as transistors or diodes. In this application, a pattern of grooves is formed upon the surface of a semiconductor slice of, for example, silicon or germanium to define a plurality of semiconductor wafers thereon. The semiconductor slice may be approximately 1 inch in diameter and 0.010 inch in thickness. The wafers defined upon the surface of the semiconductor slice may vary in dimension from 0.050 to 0.100 inch on a side. Thereafter, the slice is submerged in water and the pressure acting on the surface of the water is reduced to the vapor pressure of the water. Next, the water is subjected to ultrasonic vibrations which induce cavitation in the water at the surface of the semiconductor slice to sever the slice along the grooves into wafers.

In one example of the method of the present invention a silicon slice, 1 inch in diameter and 0.015 inch in thickness, was submerged in water contained in a 120-ml. flask, and the flask was submerged in ½ gallon of water contained in an ultrasonic tank, Model No. T1–4 sold by Acoustica Associates, Inc. Then the pressure acting upon the surface of the water was reduced substantially to its vapor pressure, approximately 20 mm. Hg. The vapor pressure was selected since it could be easily obtained by using a conventional aspirator pump and easily measured by observing the surface of the water. Next, an Acoustica generator, Model No. DR50AH, operating at an input power of 345 watts was utilized to apply ultrasonic vibrations at a frequency of 40 kc. to the water. The position of the flask was adjusted to place the silicon slice in a region of maximum vibrational amplitude. Thereafter, the time required for separating 90 percent of the wafers from the silicon slice was approximately 15 seconds.

As mentioned earlier in the specification, the phenomenon of cavitation is a rupturing which occurs within a liquid which is subjected to vibrations. The rupturing of the liquid occurs when the power level of the applied vibrations equals or exceeds the threshold value for cavitation in the liquid and results in discontinuities or cavities which form within the liquid. The discontinuities collapse almost immediately and the surrounding liquid then rushes in to fill the voids formed by the discontinuities resulting in violent implosions. As the inrushing liquid comes together, the local pressure at the implosions within the liquid is momentarily raised to a very high value. If this formation and collapse of discontinuities within the liquid occurs at or near the surface of a brittle substrate submerged in the liquid, then the surface of the substrate is locally stressed beyond its elastic limit resulting in eventual fracture of the substrate.

The vibrations in the liquid result in vibratory movement of the submerged substrate. It is thought that the vibration of the substrate facilitates cavitation which occurs at its surface by tearing the substrate away from the liquid adjacent to its surface. This violent movement of the substrate relative to the liquid results in the above-mentioned discontinuities or cavities in the liquid at the surface of the substrate. The cavities are almost immediately filled by the surrounding liquid which impacts against the surface of the substrate to induce stresses within the substrate. The grooves act as stress concentration areas and facilitate the severing of the substrate into well-defined sections.

Reducing the pressure on the liquid does not change the intensity of any single cavitation implosion, but it does increase the incidence of cavitation events per unit volume of liquid. The net result is that at any power level of ultrasonic vibrations, the rate of cavitation is increased to a value substantially greater than the corresponding value which would be obtained if the applied pressure remained at atmospheric level.

Thus, it can be seen that the reduction of the applied pressure is an important step in the method of the present invention. Reducing the pressure permits an increased rate of cavitation at any level of applied power. The increased rate of cavitation results in greater stressing forces being applied to the surface of the substrate submerged in the liquid and facilitates the severing of the substrate at low levels of input power.

It is contemplated that the method of the present invention may be utilized to sever any substrate of brittle material along grooves formed on its surface. The practice of the present invention is not limited to the manufacture of semiconductor devices but may be used to separate brittle materials, such as glass, ceramics, or other brittle substrate materials into sections defined by grooves formed upon the surface of the materials.

The method of severing substrates of brittle materials along prescribed lines which has been described above is merely an illustration of the principles of the present invention and modifications in the steps of the method or variations in the sequence of steps may be made without departing from the scope of the invention. The apparatus described above is simply illustrative of a system suitable for practicing the method of the present invention, and modifications in the apparatus can be made by persons skilled in the art without departing from the scope of the present invention.

What is claimed is:

1. A method of severing a substrate of brittle material which comprises:

forming a groove running completely across said substrate, submerging said substrate in a liquid, reducing the pressure acting on the surface of said liquid, and subjecting said liquid and substrate to ultrasonic vibrations to sever said substrate along said groove.

2. A method of severing a brittle substrate which comprises:

scribing a plurality of intersecting grooves on the surface of said substrate to form surface irregularities acting as stress concentration areas and dividing said substrate into discrete sections, submerging said substrate in a liquid susceptible to cavitation, reducing the pressure acting on the surface of said liquid to the vapor pressure of said liquid, and subjecting said liquid and substrate to ultrasonic vibrations to induce cavitation at the surface of said substrate to stress said substrate along said grooves and sever said substrate into said discrete sections.

3. A method of severing a substrate of brittle material which comprises:

forming a plurality of intersecting grooves to define discrete substrate sections on the surface of said substrate, submerging said substrate in a liquid, subjecting said liquid and substrate to ultrasonic vibrations to induce cavitation in said liquid, and reducing the pressure acting on the surface of said liquid to induce an increased rate of cavitation in said liquid and concentrate stresses along said grooves to sever said substrate along said grooves into said discrete substrate sections.

4. A method of separating a brittle semiconductor slice into wafers which comprises:

scribing a pattern of intersecting grooves on said slice to define a plurality of semiconductor wafers thereon, submerging said slice in a liquid susceptible to cavitation when subjected to ultrasonic vibrations, reducing the pressure acting on the surface of said liquid to increase the incidence of cavitation in said liquid, and subjecting said liquid to ultrasonic vibrations to induce cavitation in said liquid at the surface of said slice and concentrate stresses along said grooves to sever said slice into said wafers.

5. A method of separating a brittle semiconductor slice into semiconductor wafers which comprises:

scribing a pattern of intersecting grooves on said slice to define a plurality of semiconductor wafers thereon, submerging said slice in water susceptible to cavitation when subjected to ultrasonic vibrations, reducing the pressure acting on the surface of said water to the vapor pressure of said water to increase the incidence of cavitation in said water, and subjecting said water to ultrasonic vibrations to induce cavitation in said water at the surface of said slice and concentrate stresses along said grooves to sever said slice into said wafers.

6. A method of separating a brittle semiconductor slice having a diameter on the order of 1 inch and a thickness on the order of 0.010 inch into wafers having lateral dimensions on the order of 0.050 inch which comprises:

scribing a generally rectangular pattern of intersecting grooves on the surface of said slice to divide said surface into wafers having lateral dimensions on the order of 0.050 inch, submerging said slice in water susceptible to cavitation when subjected to ultrasonic vibrations, subjecting said water to ultrasonic vibrations to induce cavitation in said water at the surface of said slice, and reducing the pressure acting on the surface of said water to the vapor pressure of said water to increase the rate of cavitation in said water to stress said slice along said grooves and to sever said slice into said wafers.

References Cited

UNITED STATES PATENTS

| | | | |
|---|---|---|---|
| 3,112,850 | 12/1963 | Garibott | 225—2 |
| 3,169,837 | 2/1965 | Moross et al. | 225—2 X |

JAMES M. MEISTER, *Primary Examiner.*